(12) United States Patent
Camarota et al.

(10) Patent No.: US 6,592,240 B2
(45) Date of Patent: Jul. 15, 2003

(54) LIGHTED HANDLE

(75) Inventors: Richard J. Camarota, Holland, MI (US); Richard Hartmann, Jr., Holland, MI (US)

(73) Assignee: ITC Incorporated, Holland, MI (US)

( * ) Notice: Subject to any disclaimer, the term of this patent is extended or adjusted under 35 U.S.C. 154(b) by 0 days.

(21) Appl. No.: 09/999,814

(22) Filed: Oct. 31, 2001

(65) Prior Publication Data

US 2003/0081401 A1 May 1, 2003

(51) Int. Cl.[7] ............................................. F21V 21/08
(52) U.S. Cl. ...................... 362/399; 362/577; 362/551
(58) Field of Search ............................. 362/31, 30, 26, 362/27, 29, 577, 337, 251, 551, 327, 399; 16/110.1, 436, 111.1, 903

(56) References Cited

U.S. PATENT DOCUMENTS

| | | | |
|---|---|---|---|
| 1,203,576 A | 11/1916 | Broadhead | 340/321 |
| 2,242,981 A | 5/1941 | Pedersen | 362/577 |
| 2,479,500 A | 8/1949 | Longberg | 362/576 |
| 4,231,077 A | 10/1980 | Joyce et al. | 362/577 |
| 4,274,131 A | 6/1981 | Praamsma | 362/355 |
| 4,924,357 A * | 5/1990 | Yamashita et al. | 355/67 |
| 5,339,228 A | 8/1994 | Baethge et al. | 362/146 |
| 5,396,740 A | 3/1995 | Bocchi | 52/33 |
| 5,692,822 A | 12/1997 | Dreyer | 362/552 |
| 5,957,566 A | 9/1999 | Chiu | 362/190 |
| 6,058,230 A * | 5/2000 | Ward | 385/139 |
| 6,135,621 A | 10/2000 | Bach et al. | 362/399 |
| 6,139,174 A * | 10/2000 | Butterworth | 362/231 |
| 6,267,492 B1 * | 7/2001 | Reid et al. | 362/287 |
| 6,488,397 B1 * | 12/2002 | Masutani et al. | 362/551 |

* cited by examiner

*Primary Examiner*—Sandra O'Shea
*Assistant Examiner*—Hargobind Singh Sawhney
(74) *Attorney, Agent, or Firm*—Flynn, Thiel, Boutell & Tanis, P.C.

(57) ABSTRACT

A lighted handle includes an elongate light transmitting member that has first and second end portions. First and second support surface engageable mounting brackets carry the first and second end portions of the light transmitting member. A narrow beam light emitter is located in the first mounting bracket and has a light beam emitting end. The light beam emitting end faces the adjacent first end portion of the light transmitting member and is aimed longitudinally along the light transmitting member to make the same more visible.

37 Claims, 16 Drawing Sheets

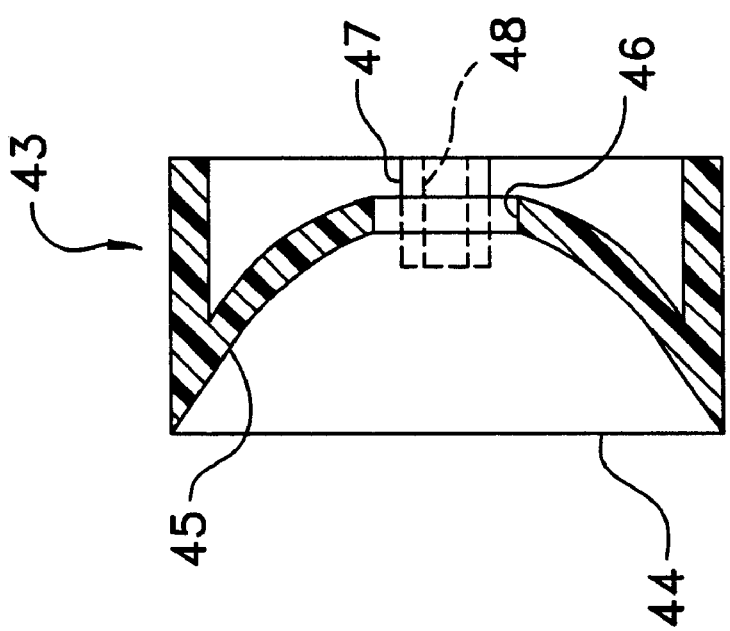
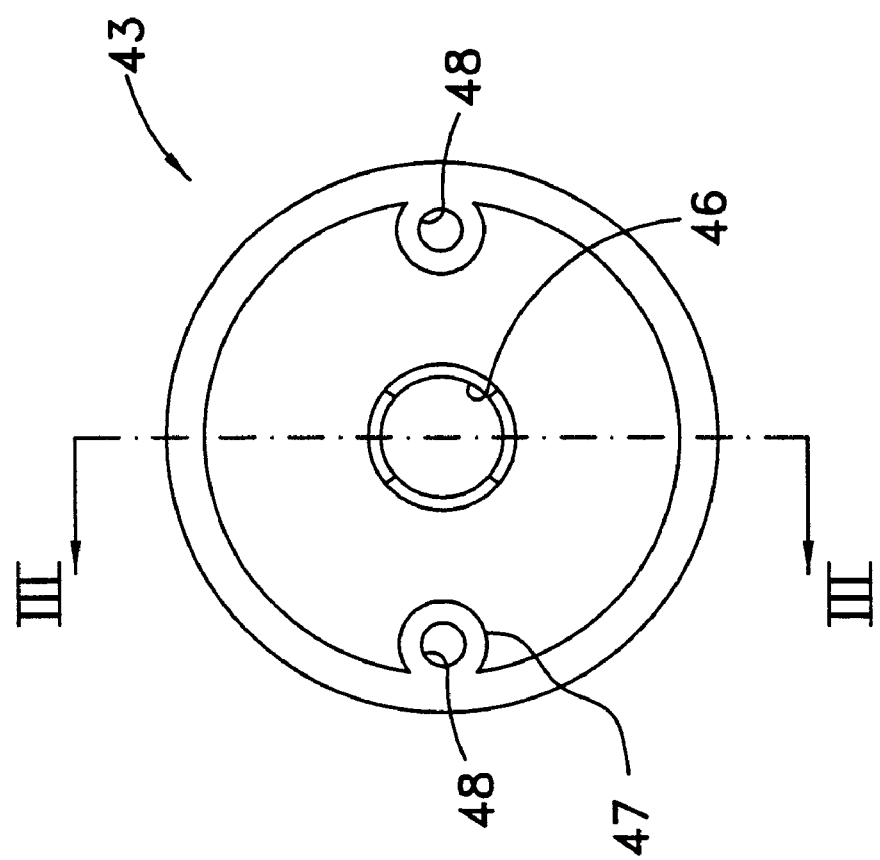
FIG. 3B
FIG. 3A

LIGHTED HANDLE

FIELD OF THE INVENTION

This invention relates generally to handles.

BACKGROUND OF THE INVENTION

Handles have been positioned adjacent steps and along walkways for gripping by and assistance to a person moving therealong. For instance, recreational vehicles and boats have often included such handles. For example, such a handle is often located near a door of a recreational vehicle on the outside wall to aid a person stepping up into, or down from such a vehicle. In addition, such a handle may be located near the cockpit-to-cabin steps and/or along walkways in a boat to steady a person against boat movement in a seaway.

However, it is sometimes difficult for a person to easily see such a handle, which can blend in to its surroundings, and/or be hidden by twilight or the darkness of night. Such a handle can be made more visible by illumination by a nearby independent light source. However, such a light source may cause extra expense for materials and installation, and, in the case of the visual incandescent fixture, electric power use.

U.S. Pat. No. 6,135,621 of Bach, et al. (hereafter the '621 patent) discloses a handle comprising a light transmitting rod 12 carried by end brackets. A '621 patent disclosed bracket encloses an incandescent light bulb 14 which "emits light in all directions". Some of this light is emitted directly toward the adjacent end of the rod 12. A first curved mirror 18 behind the bulb 14 reflects a remaining portion of the light toward the adjacent end of the rod 12. A lens 16 located at the first end 11 of the rod 12 "reflects light in different directions". Thus, the '621 patent disclosed device is complicated by its requirement for a divergent lens 16, as well as a curved mirror, or reflector, 18. Absent the curved mirror 18, for example, most of the light emitted by the bulb 14 would radiate away from, rather than into, the light transmitting rod 12.

The objects and purposes of the present invention include improvement on prior art devices including the '621 patent device above discussed.

SUMMARY OF THE INVENTION

This invention is directed to a new and useful lighted handle. The lighted handle of this invention includes a light transmitting member having a first end portion, a second end portion and a central portion. A first end bracket carries the first end portion and a second end bracket carries the second end portion. Positioned between the light transmitting member and the first end bracket is a narrow beam light emitter, conveniently a light emitting diode (LED).

BRIEF DESCRIPTION OF THE DRAWINGS

FIG. 3A is a bottom view of the casing portion of the reflector of FIG. 1A;

FIG. 3B is a cross-sectional view of the reflector casing of FIG. 3A along the section lines III—III;

DETAILED DESCRIPTION

Figure 1:
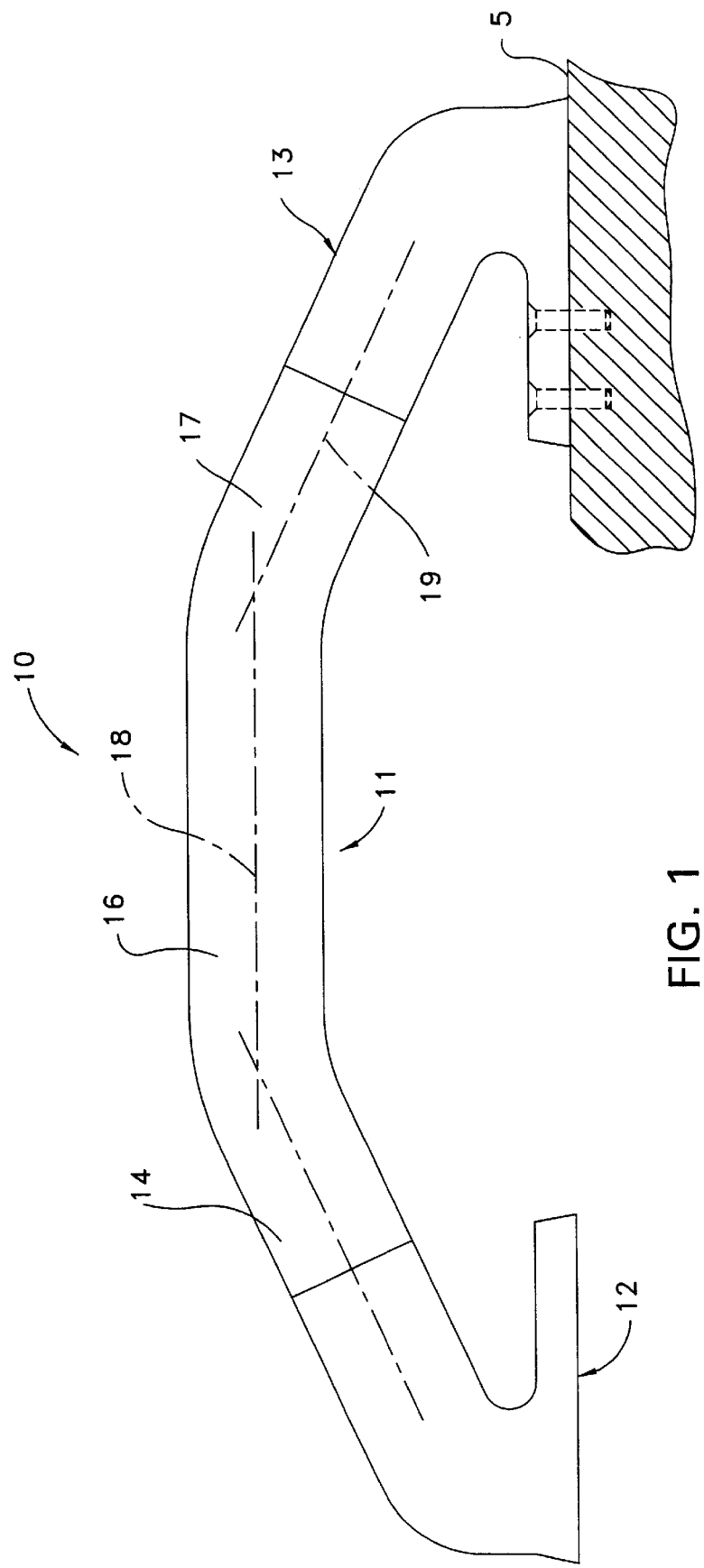
FIG. 1 is an elevational view of a lighted handle according to one embodiment of this invention.

FIG. 1 shows a lighted handle 10 according to one embodiment of the present invention. The lighted handle 10 includes a light transmitting member 11 that is fixedly carried and flanked by preferably identical end brackets 12 and 13.

The light transmitting member 11 (FIG. 1) has a first end portion 14 coupled to a second end portion 17 by a central portion 16. The light transmitting member 11 comprises a rigid, preferably transparent and preferably circular cross-section rod of suitable material, preferably an extrudable polymer, such as acrylic. The light transmitting member 11 may be straight or of any desired shape. However, and preferably, the FIG. 1 light transmitting member 11 is bent, such that the first end portion 14 and the second end portion 17 are bent away from a central portion longitudinal axis 18. Preferably, the first end portion 14 and the second end portion 17 are bent at an angle between 20 to 30 degrees, and preferably about 25 degrees, with respect to the central portion longitudinal axis 18. Thus, the light transmitting member 11 as a whole can be said to have a bent central axis 19 which includes the central longitudinal axis 18, the first end portion 14, the central portion 16 (at 18) and the second end portion 17.

Figure 1A:
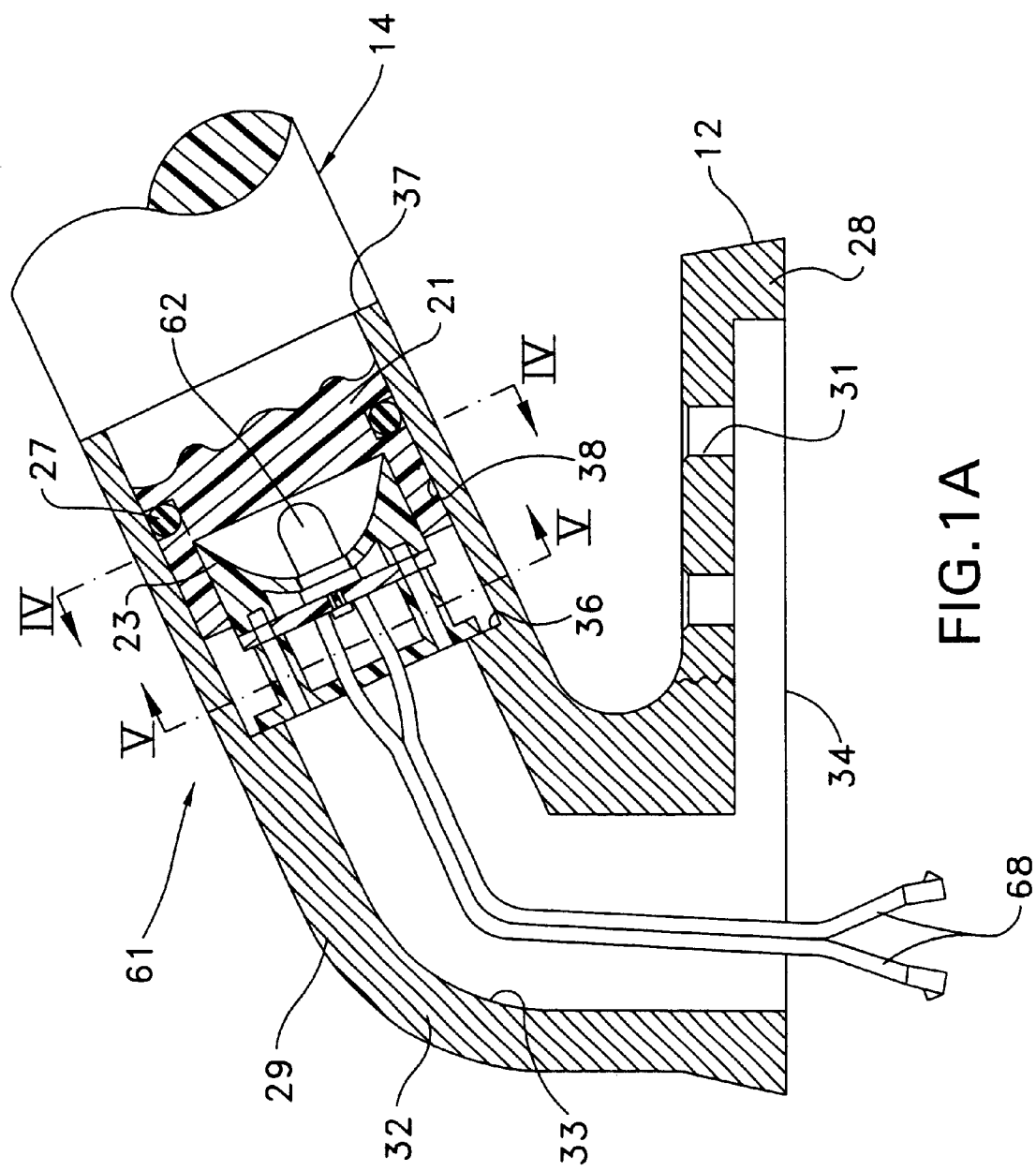
FIG. 1A is an enlarged cross-sectional view of the first end portion of the lighted handle of FIG.

The end portions 14 and 17 (FIGS. 1A and 1C) of the light transmitting member 11 terminate in reduced diameter, preferably cylindrical necks 21 and 22. The necks 21 and 22 have respective end opening recesses 23 and 24 (one of which is illustrated in FIG. 2A). The necks are virtually identical, except that neck 21 has an annular groove 26 (FIG. 2A). A resilient annular seal, illustrated herein as an O-ring, 27 is snap fitted in the groove 26 (FIG. 1A).

Figure 1B:
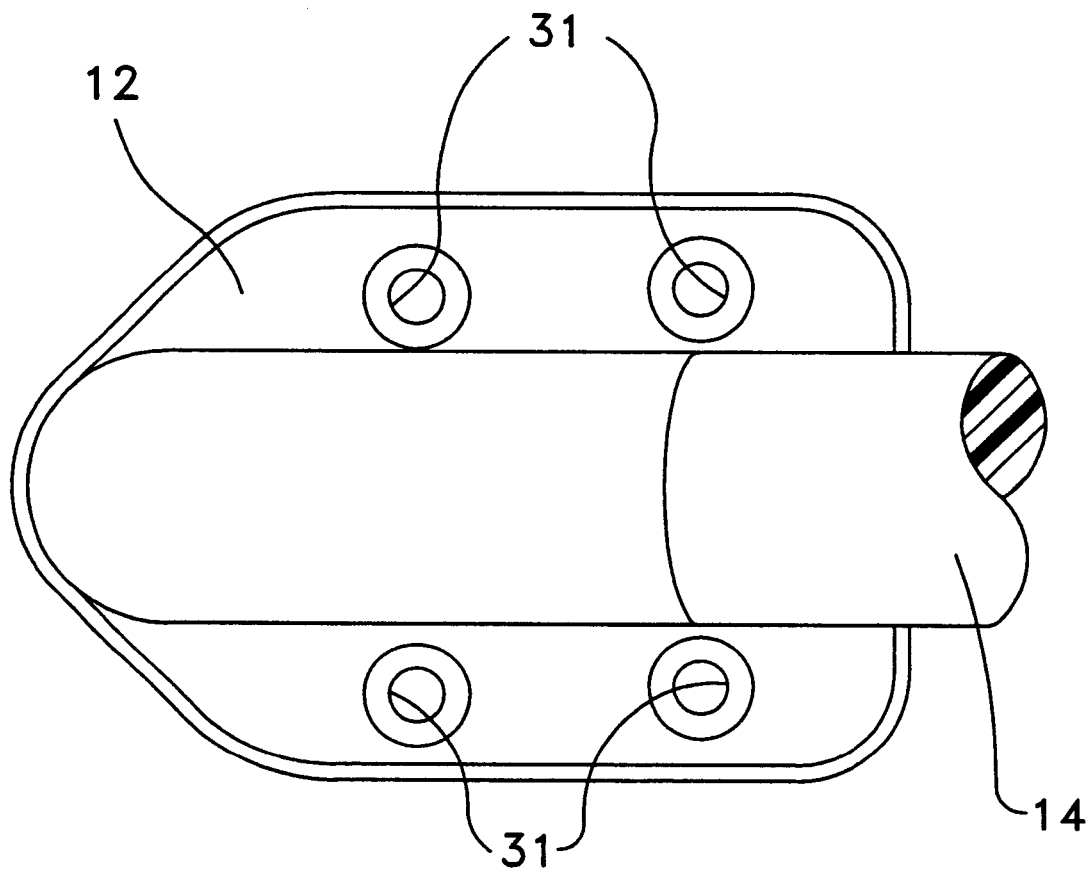
FIG. 1B is a top view of the first end portion of the lighted handle of FIG. 1.

The first end bracket 12 (FIGS. 1A and 1B) includes a mounting foot 28 and a bent hollow leg 29 fixedly upstanding therefrom. The bracket 12 is rigid and is preferably composed of a cast metal, for example aluminum, or a molded plastic. The foot 28 preferably includes mounting holes 31 for receiving fasteners (e.g. screws), to facilitate attachment of the lighted handle 10 to an existing wall or other surface at a site of use, such as the surface 5 illustrated in FIG. 1.

The hollow leg 29 (FIG. 1A) comprises an outer peripheral wall 32 which surrounds a through. opening 33 continued through the foot 28 and a free end 34 of the leg 29. The through opening 33 has an annular step 36 opening toward a top free end 37 of the outer wall 32 and forming a recess 38. The recess 38 is longer than, and corresponds in diameter to, the neck 21.

The second end bracket 13 is identical to the first end bracket 12 and so carries the same reference numerals, and needs no further description.

As illustrated in FIG. 2A, the handle 10 further includes a light directing insert 41 comprising a locator unit 42 and an illumination unit 61 for disposition between the bracket 12 and the light transmitting member 11 (FIG. 1A).

The locator unit 42 (FIGS. 2B, 3A and 3B) comprises a generally circularly cylindrical casing 43 closely corresponding in diameter to the light transmitting member end recess 23, for snug, coaxial reception therein. The casing 43 has a coaxially concave top end 44 facing the recess 23 and having a reflective top surface shaped to reflect a substantially non-diverging light beam and defining a reflector 45. The reflector 45 is preferably a parabolic reflector. A bore 46 extends coaxially through the casing 43. To save material, the bottom of the casing 43 is here dish-shaped in complement to the concave top end 44 to form bosses 47. Blind bores 48 extend into the bottom of the respective bosses 47.

The locator unit 42 has a central portion 50 (FIG. 2B) preferably formed as a circular disk. Extending through the central portion 50 are first outboard, preferably diametrically opposed bores 51 and second inboard bores 52.

Figure 2A:
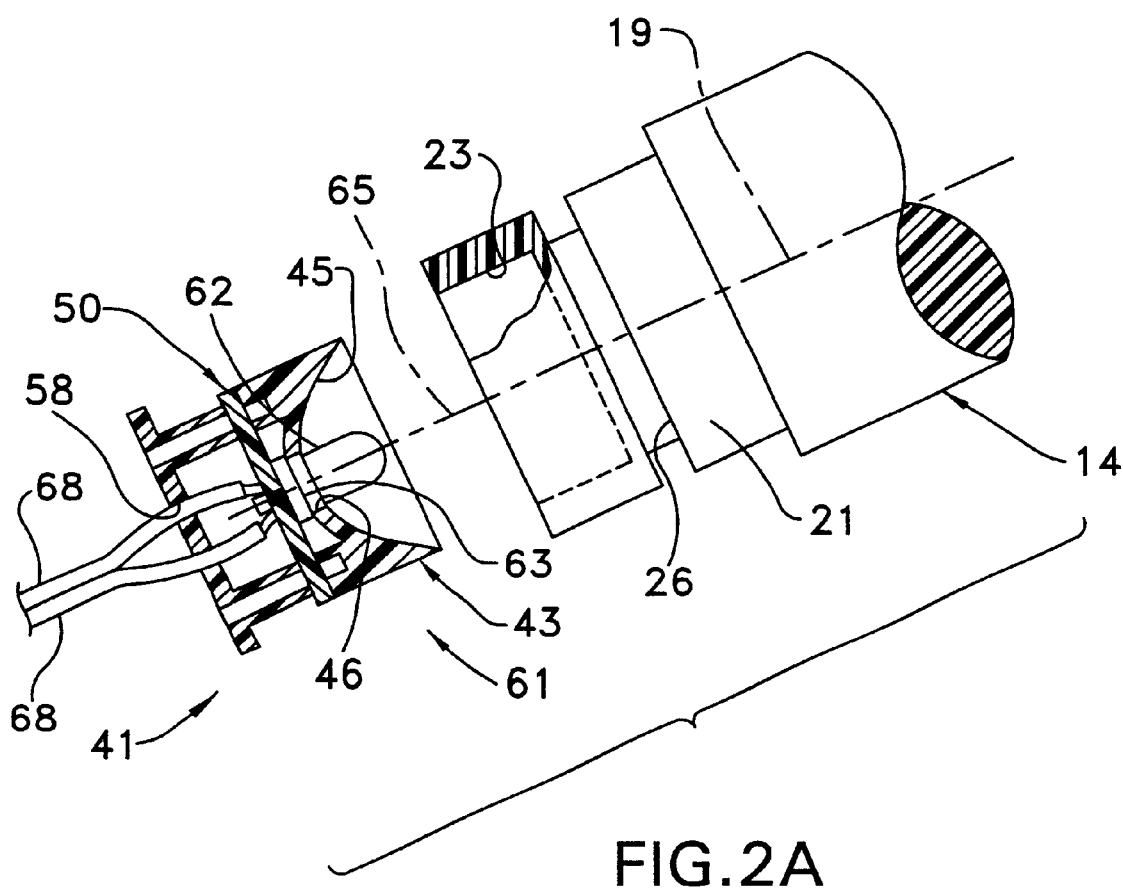
FIG. 2A is an exploded view of the first end portion of the lighted handle of FIG. 1A without the bracket.
Figure 2B:
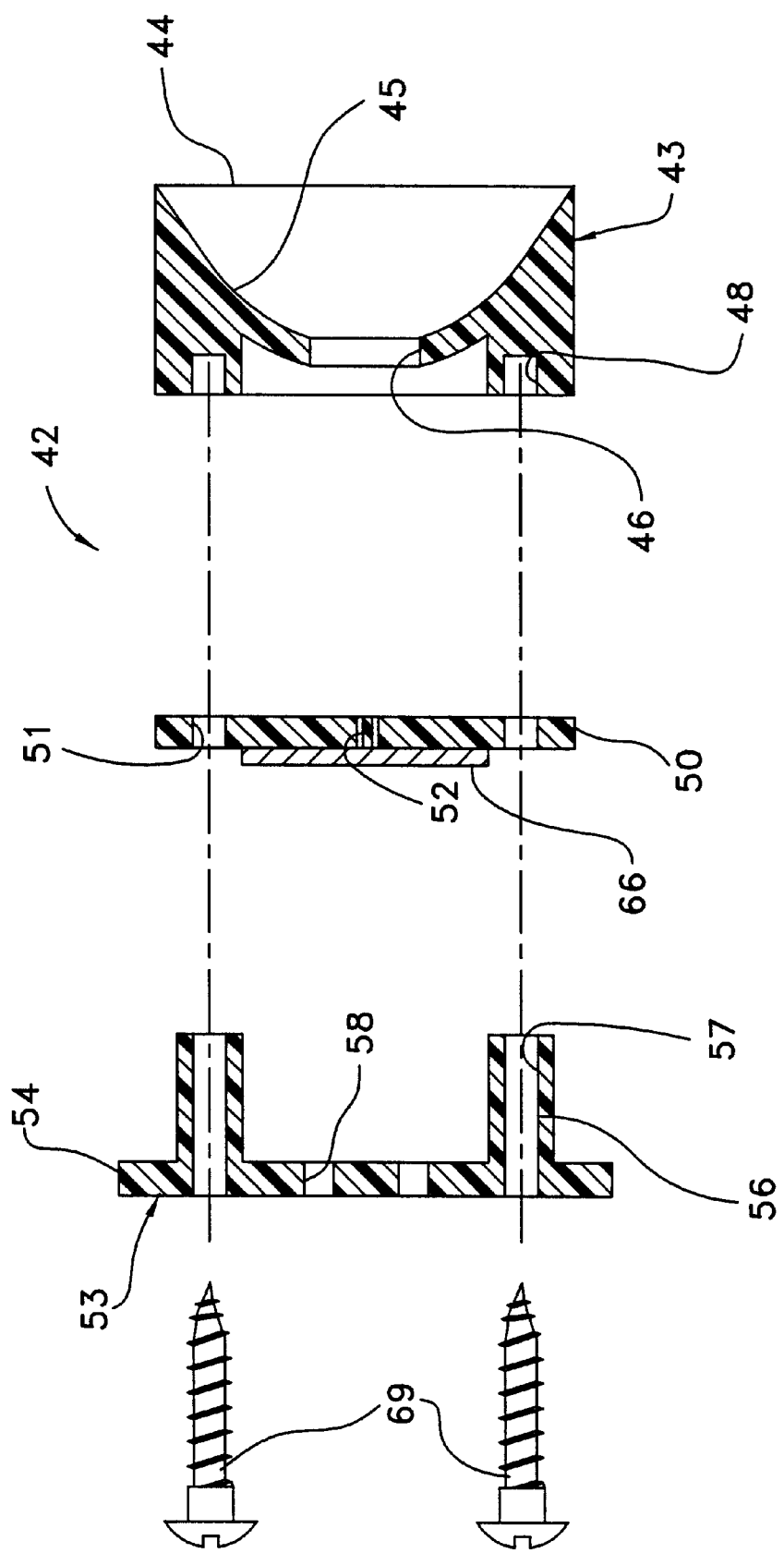
FIG. 2B is an exploded view of the reflector of FIG. 1A.
Figure 4:
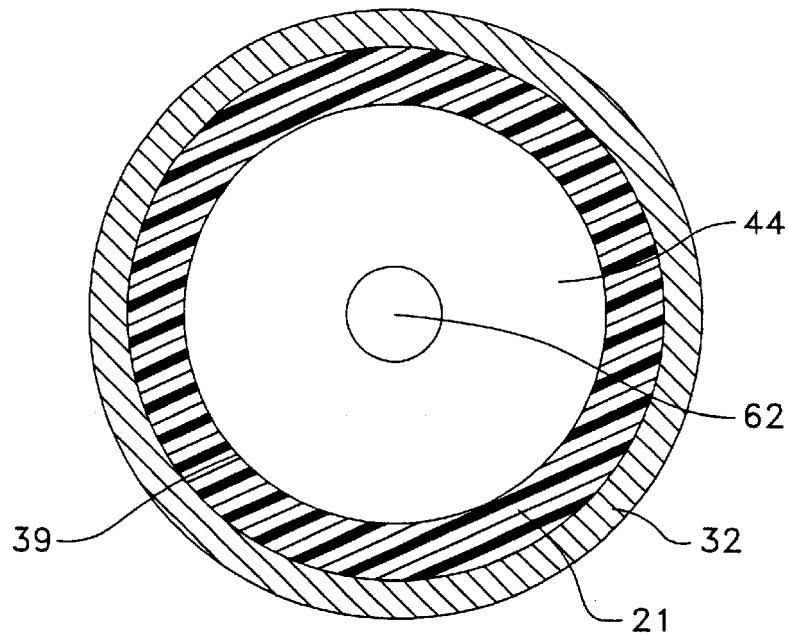
FIG. 4 is a cross-sectional view of the first end portion of the lighted handle of FIG. 1A, along the section lines IV—IV.

The locator unit 42 further includes an end piece 53 (FIG. 2B). The end piece 53 comprises a disk-like base 54 of diameter intermediate the outer and inner diameters of the step 36 of the end bracket 12. Bosses 56 upstanding from the base 54 have through bores 57 aligned with the outboard bores 51 and blind bores 48. Inboard holes 58 pass through the base 54.

The illumination unit 61 (FIG. 2A) includes a light emitter 62 that snugly extends through the bore 46 coaxially of the reflector 45 and has a base flange 63 that seats against the bottom of the casing 43. The light emitter 62 is preferably a light emitting diode (LED) that advantageously emits a relatively narrow light beam, and does not waste electric energy in emitting light in undesired other directions, an energy efficiency which is particularly desirable when using a vehicle battery as the energy supply. The light emitter 62 here generates white light, though colored light emitters may be used.

Figure 5:
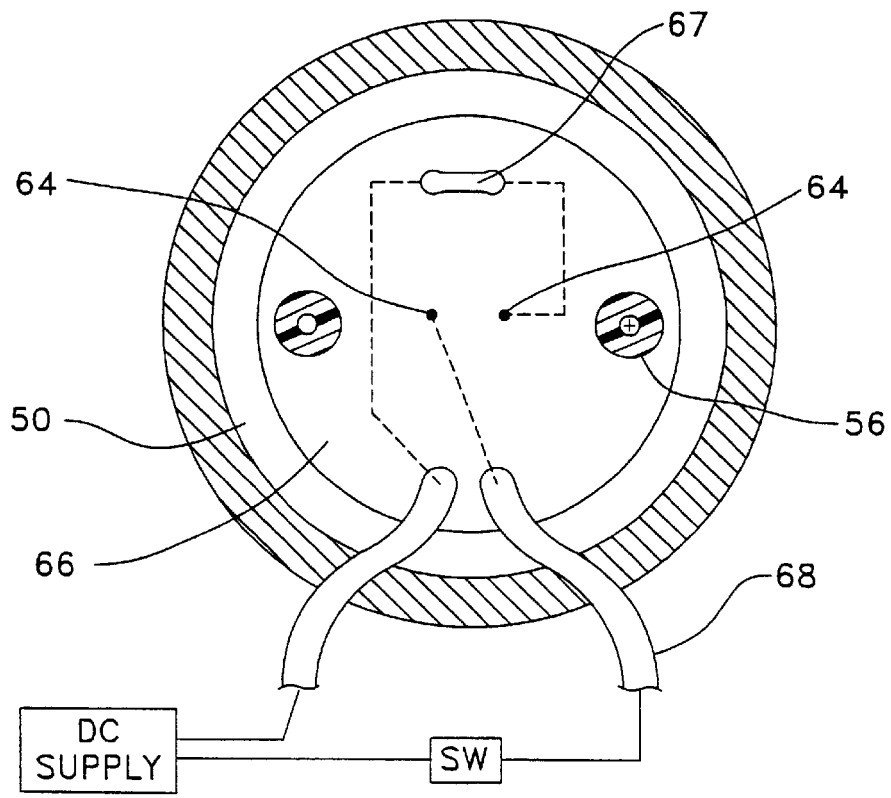
FIG. 5 is a cross-sectional view of the first end portion of the lighted handle of FIG. 1A, along the section lines V—V.

The illumination assembly 61 further includes a flat printed circuit board 66 fixed to the underside of the disk 50 (FIGS. 2B and 5). The light emitter 62 has two side-by-side spaced electrical supply conductors 64 (FIG. 5) extending from the base thereof through the disk holes 52 (FIG. 2A) and aligned extensions of those holes through the printed circuit board 66. A load resistor 67 is fixed at the underside of the printed circuit board 66. Insulated wires 68 extend into the bottom of the bracket 12, up through the base holes 58 (FIG. 2A) and to the printed circuit board 66. Printed circuit board conductors, schematically illustrated by dotted lines in FIG. 5, electrically connect the supply conductors 64 of the light emitter 62 and resistor 67 in series with the wires 68.

The casing 43, central portion (disk) 50 and end piece 53 of the locator unit 42 are coaxially stacked and are pressed together by suitable fasteners, such as screws 69, inserted through aligned sets of the bores 48, 51 and 57, to assemble the light directing insert 41 with the disk 50 pressing the LED 62 up against the bottom of the casing 43.

The handle 10 (FIG. 1C) further includes a light deflecting unit 71 for disposition between the bracket 13 and the light transmitting member 11. The light deflecting unit 71 preferably is merely a casing 72 similar to the casing 43 above described but without the central bore 46 of the latter. The casing 72 has a coaxially concave top end facing the recess 24 and having a reflective top surface shaped to reflect a substantially non-diverging light beam and defining a reflector 73, preferably similar to the reflector 45. Note that the light deflecting unit 71 includes no light emitter assembly.

To assemble lighted handle 10, the light directing insert 41, which is assembled as described above, and the light deflecting unit 71 are seated in the respective recesses 23 and 24 in the respective necks 21 and 22 of the light transmitting member 11. The insert 41 is preferably removable in the unlikely event that the LED 62 requires replacement. However, it may be convenient to permanently fix the unit 71 in the neck recess 24 as by an adhesive or other suitable means.

The reduced diameter neck 21 (FIG. 1A), including the insert 41, is inserted into the recess 38 of the first end bracket 12. The step 36 is positioned sufficiently below the top surface 37 to allow the entire reduced diameter neck 21 of the first end portion 14 and the insert 41 to be contained within the recess 38. In addition, the combined length of the casing 43, the central portion 50 and the end piece 53 is such that when the first end portion 14 of the handle 10 is assembled, the casing 43 is positioned snugly within the recess 23 of the neck 21 while the end piece 53 rests on the step 36. The O-ring 27 is appropriately sized and positioned to create a seal between the first end portion 14 and the first end bracket 12. With the insert 41 and the neck 21 so received in the first end bracket 12, the reflector 45 and the LED 62 are coaxial with the first end portion 14 of the light transmitting member 11 and the tube axis 19 is coaxial with a length axis 65 of the light emitter 62.

When the first end portion 14 of the member 11 (FIG. 1A) is seated in the first end bracket 12, the wires 68 extend through the hollow leg 29 of the bracket 12 and out the free (bottom) end 34 thereof.

Unlike in first end bracket 12, there is no light emitter in the second end bracket 13 in the FIGS. 1–5 embodiment. Therefore, the light transmitting member reduced diameter neck 22 can, if desired, be attached to the second end bracket 13 in a permanent manner. However, an O-ring seal, similar to the O-ring 27, could instead be utilized to frictionally secure the reduced diameter neck 22 to the second end bracket 13.

The thus assembled handle 10 can then be fixed as by screws (not shown) to a desired surface, schematically indicated at 5 in FIG. 1, with the wires 68 typically led through a hole, not shown, in surface 5, e.g. to connect the light emitter conductors 64 (FIG. 5) and load resistor 67 in series to a power supply, such as a conventional electrical power supply (e.g. a 12-volt vehicle battery), or other DC power source, preferably through a manual switch and/or an ambient light sensing switch, SW or to an AC/DC converter connected to a suitable AC supply, such as a conventional 110-volt AC outlet.

OPERATION

The light emitter 62 (FIG. 1A), when activated, emits a beam of light into the adjacent end 21 of the light transmitting member 11 away from the reflector 45. The light transmitting member 11 transmits the light beam through its length to the remote reflector 73, which reflects the light beam back to the reflector 45. The light beam is thus continuously reflected back and forth through the light transmitting member 11. Light within the light transmitting member 11 illuminates its peripheral surface such that the light transmitting member 11 is easy to see in poorly lit areas.

Since the reflector 45 blocks light escape behind the light emitter 32 and the reflector 73 blocks light escape from the second end portion 17 of the light transmitting member 11, little light leaks from or is absorbed by the brackets, and is thus lost.

MODIFICATION

Figure 6:
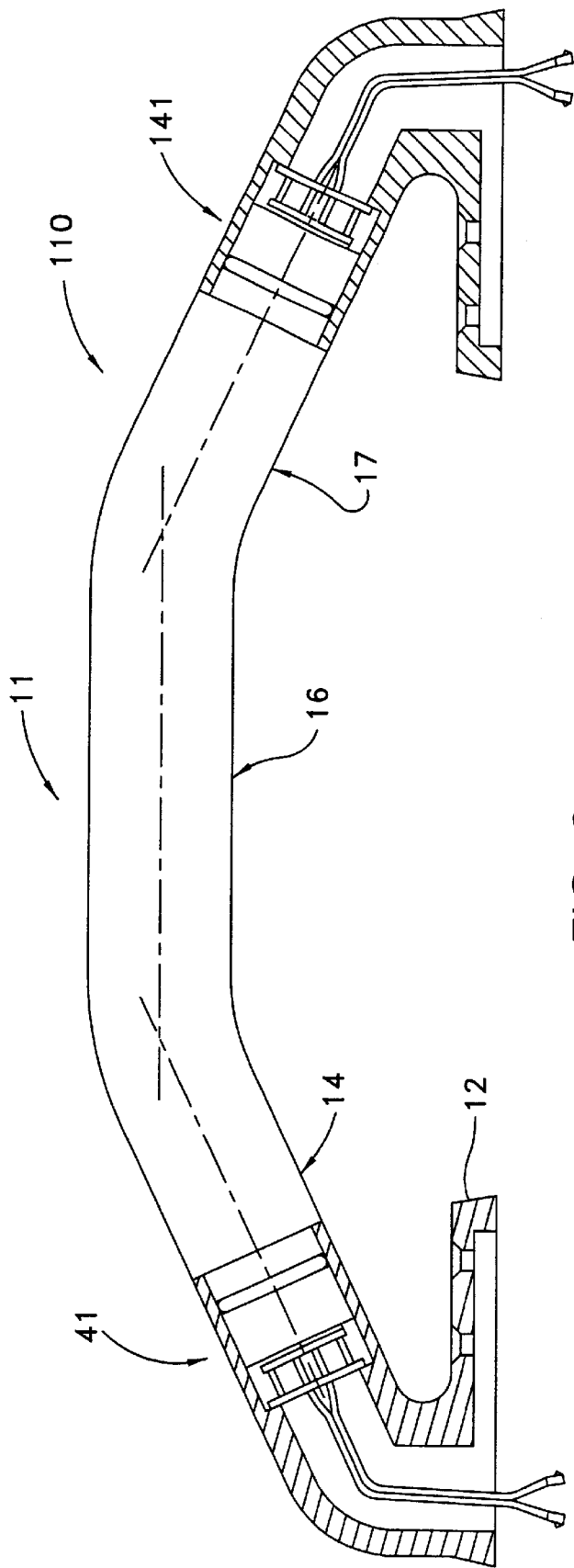
FIG. 6 is a front view of a lighted handle according to a second embodiment of this invention.

FIG. 6 shows a modified lighted handle 110.

The modified handle 110 is preferably identical to the previously described handle 10, except as described hereafter. Parts of the handle 110 that are similar to parts of the handle 10 carry the same reference numerals with the prefix "1" added thereto.

The handle 110 preferably substitutes, for the light deflecting unit 71 in the rightward part of the handle 10, a duplicate of the insert 41. Thus, the lighted handle 110 includes preferably identical first and second inserts 41 and 141 at opposite ends thereof.

FURTHER MODIFICATION

Figure 7A:
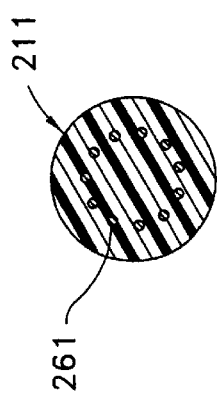
FIG. 7A is a cross-sectional view of the lighted handle of FIG. 7, along the section lines VII—VII.
Figure 7:
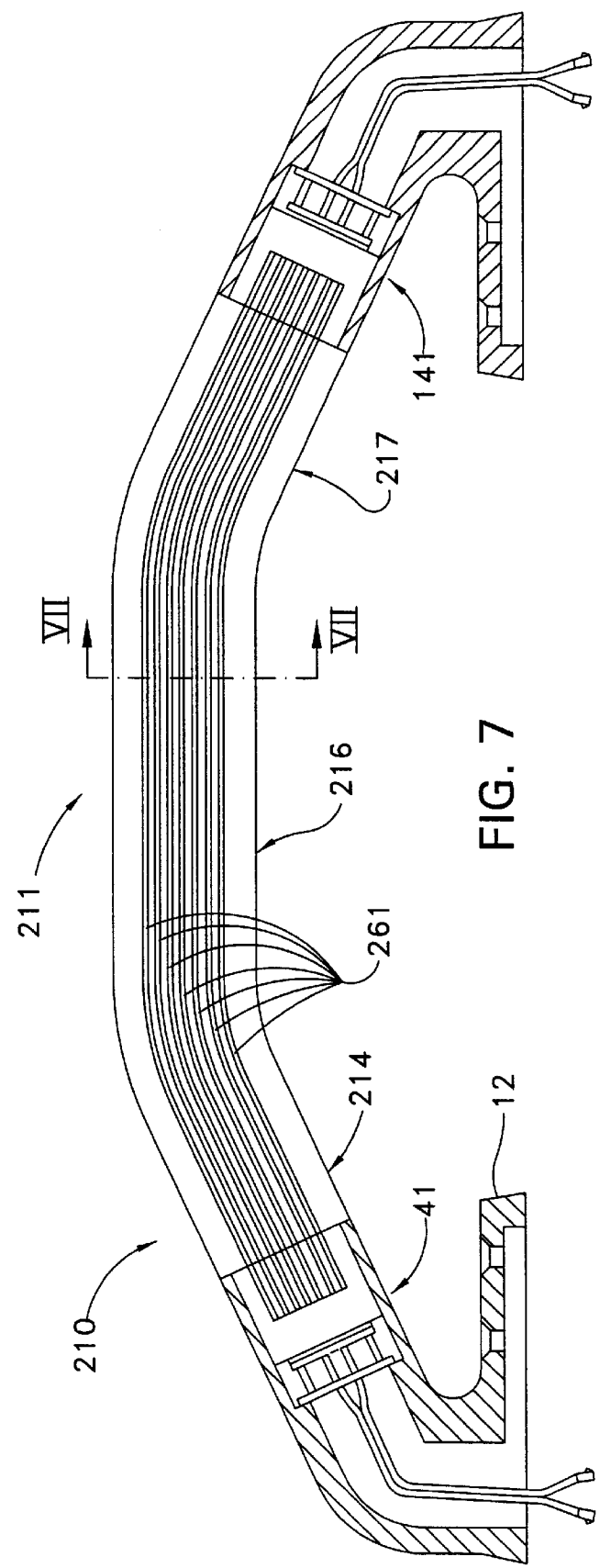
FIG. 7 is a front view of a lighted handle according to a third embodiment of this invention.

FIG. 7 shows a further modified lighted handle 210. The handle 210 is preferably identical to the previously described handles 10 and 110, except as described hereafter. Parts of the handle 210 that are similar to previously described parts of the handles 10 and 110 carry the same reference numerals with the prefix "2" added thereto. The lighted handle 210 includes one or both of the preferably identical first and second illumination inserts 41 and 141 at opposite ends thereof.

The handle 210 (FIGS. 7 and 7A) has a number of visible stripes 261 co-extruded lengthwise along and within (embedded in) the light transmitting member 211. The stripes 261 can, for example, be composed of a reflective substance, such as a reflective paint, to radially outwardly reflect the light emitted from the inserts 41. Alternatively, the stripes 261 could be composed of a non-reflective, opaque substance. Here, the stripes 261 would block light from being axially transmitted in parts of the cross-section of the light transmitting member 211. The resulting light emitting and dark zones alternating across the side of the handle could make the handle 210 easier to detect by users, such as those with impaired depth perception. Alternatively, the stripes 261 could be composed of a non-reflective, opaque substance. Here, the stripes 261 would block light from being axially transmitted in parts of the cross-section of the light transmitting member 211. The resulting light emitting and dark zones alternating across the side of the handle could make the handle 210 easier to detect by users, such as those with impaired depth perception.

FURTHER MODIFICATION

Figure 8:
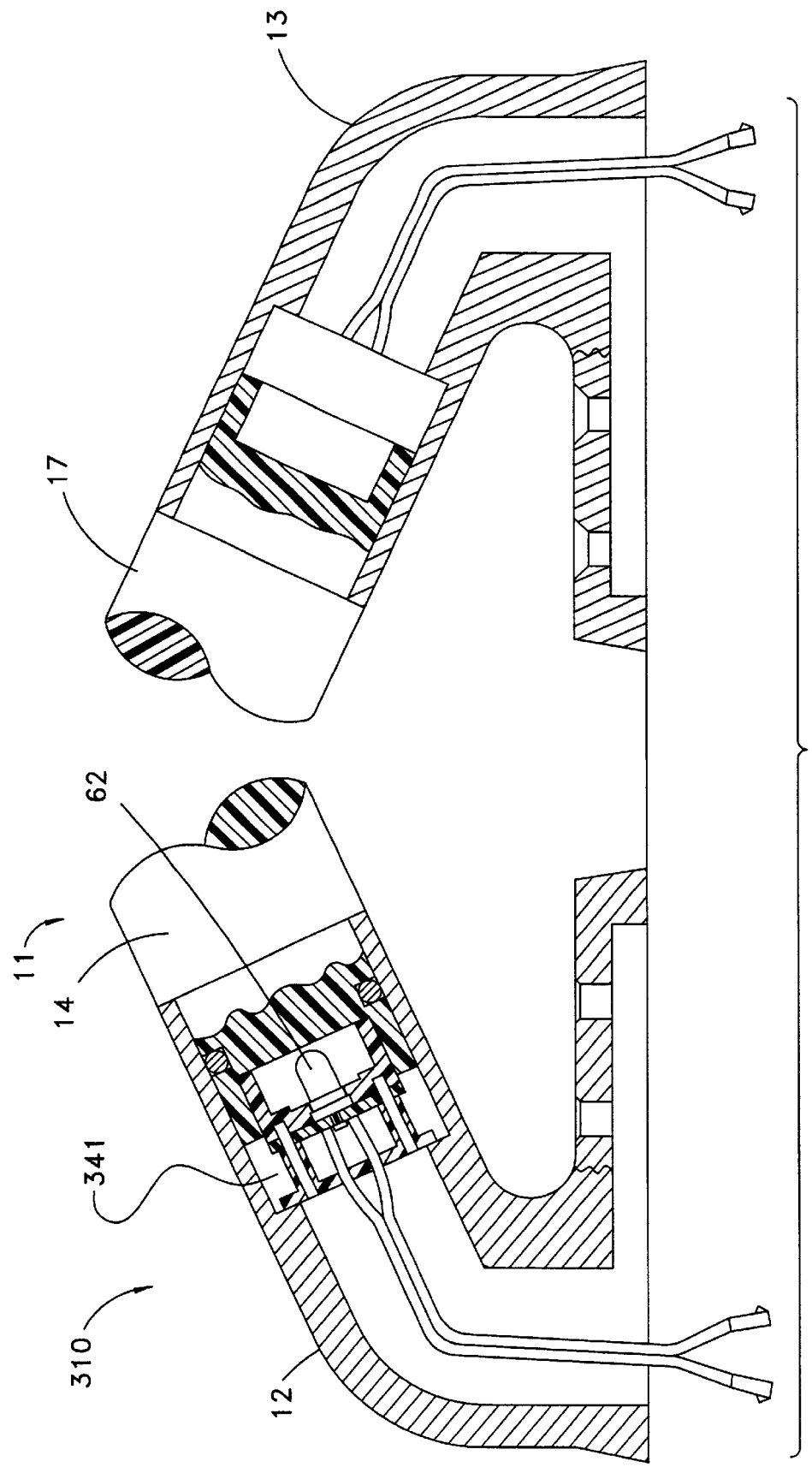
FIG. 8 is an enlarged, fragmentary, central cross sectional view of a simplified embodiment of the invention which eliminates the reflectors of the FIGS. 1–7 embodiments.

FIG. 8 discloses a simplified embodiment of the invention similar to those disclosed above with respect to FIGS. 1–6, except as follows.

The FIG. 8 handle 310 advantageously eliminates the FIGS. 1–6 reflectors 45 and 73 at the opposite ends of the light transmitting member 11. Moreover, little light energy is lost as a result, because the light emitter 62 is preferably a light emitting diode (LED). More particularly, the usual characteristic of a typical LED is light emission, not in all directions like an incandescent bulb, but rather in a narrow beam. Beam divergence is typically small, for example, between 5°–25° and usually around 15°. The LED 62 has its light beam directed coaxially along the light transmitting member 11 and directly toward its opposite end. The amount of light emitted by the LED in other directions is typically negligible. Thus, the backing reflector 45 in FIG. 2A would have relatively little light to reflect into the light transmitting bar 11 and while such reflector may somewhat improve the efficiency of illumination of the member 11, in practice the improvement may be small enough to be difficult to notice.

Figure 11:
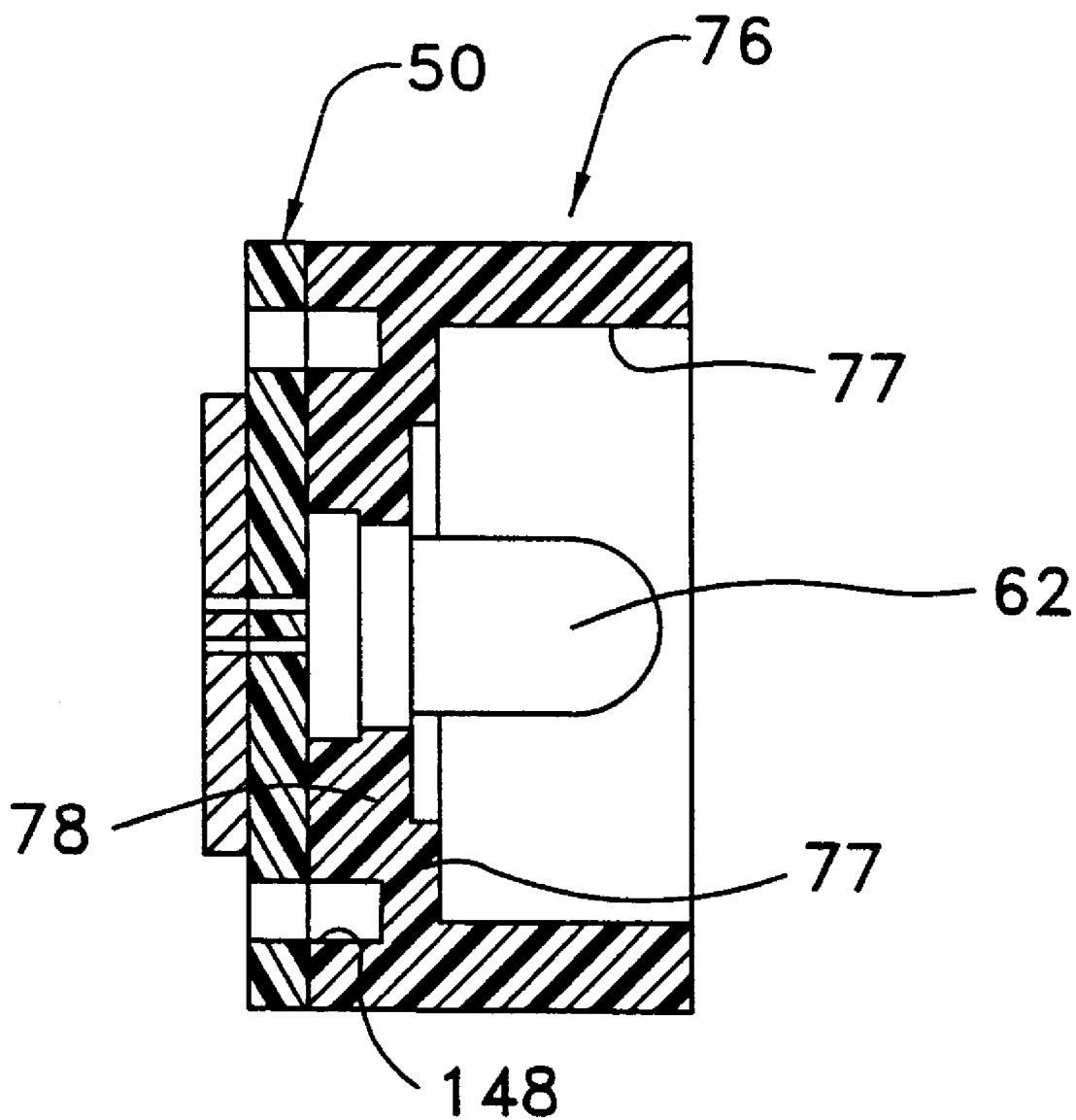
FIG. 11 is an enlarged fragment of FIG. 8.

In FIG. 8, a light directing insert 341 including the LED 62 is mounted at one (if desired) or both ends (as shown) of the light transmitting member 11, with the FIGS. 2–7 casings 43 (with their reflectors 45) substituted each by a casing 76 (FIG. 11) simplified by substituting, for the precisely formed reflector 45, a non-critically shaped and dimensionally generally cup shaped recess 77. The bottom 78 of the casing 76 is thickened at 79 to accommodate the blind bores 348. The thickened portions 79 may be annular as shown or in the form of circumferentially spaced bosses, if desired.

Figure 1C:
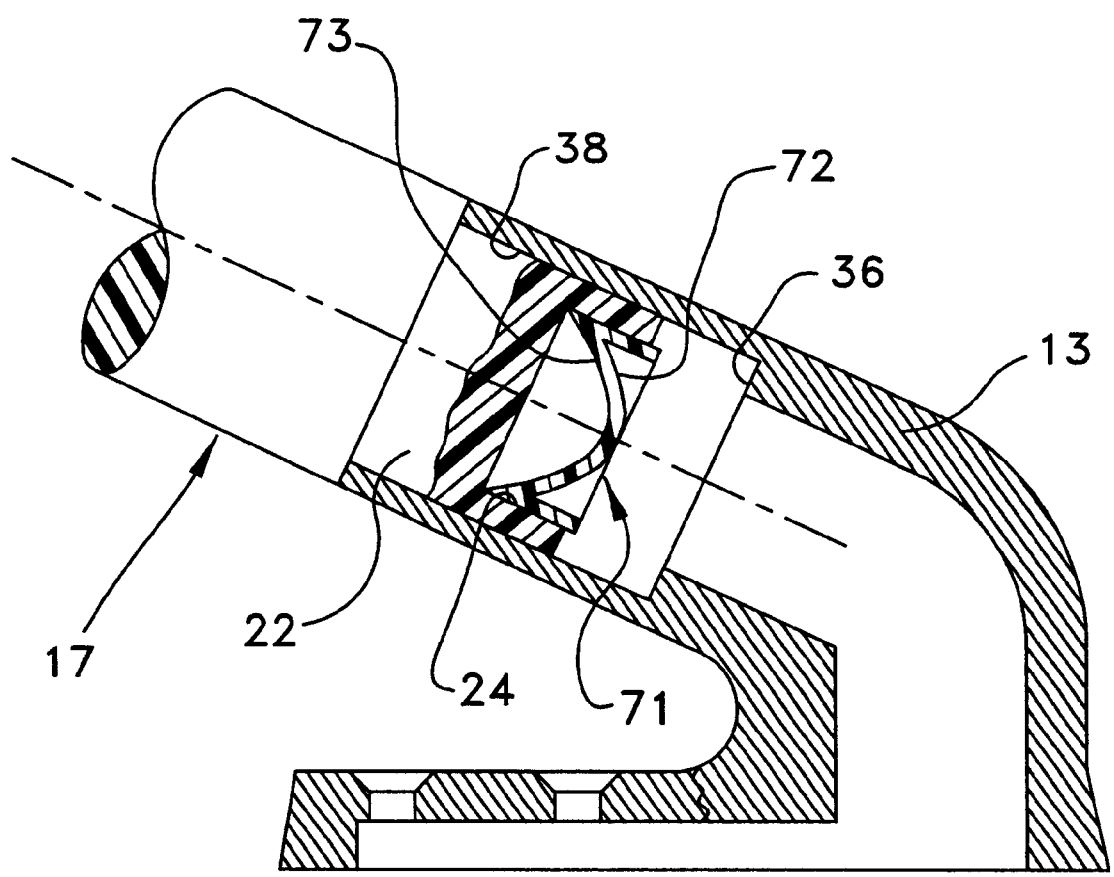
FIG. 1C is an enlarged cross-sectional view of the second end portion of the lighted handle of FIG.

The reflector 73 at the opposite end of the light transmitting member 11 (the end without an LED) in FIG. 1C can be retained in the handle 310, or as shown in FIG. 8, eliminated. The latter may cause the brightness of the member 11 in FIG. 8 to be somewhat, but not greatly, diminished. That could be regarded as a fair tradeoff for the structural simplification and cost reduction achieved by the elimination of the reflector.

Figure 9:
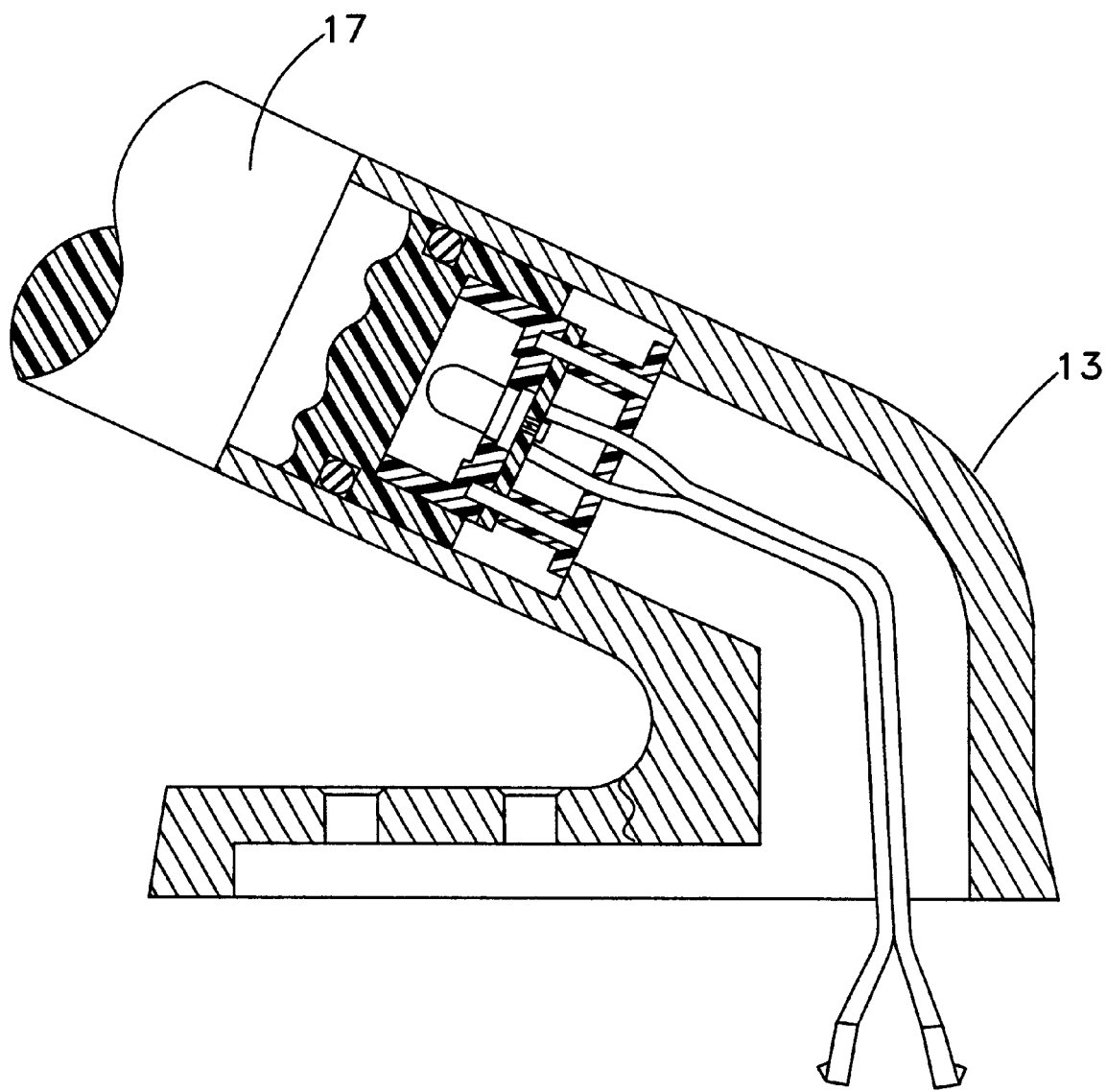
FIG. 9 is a fragment of FIG. 8 modified to show a second light source at a second end portion of the light transmitting member.
Figure 10:
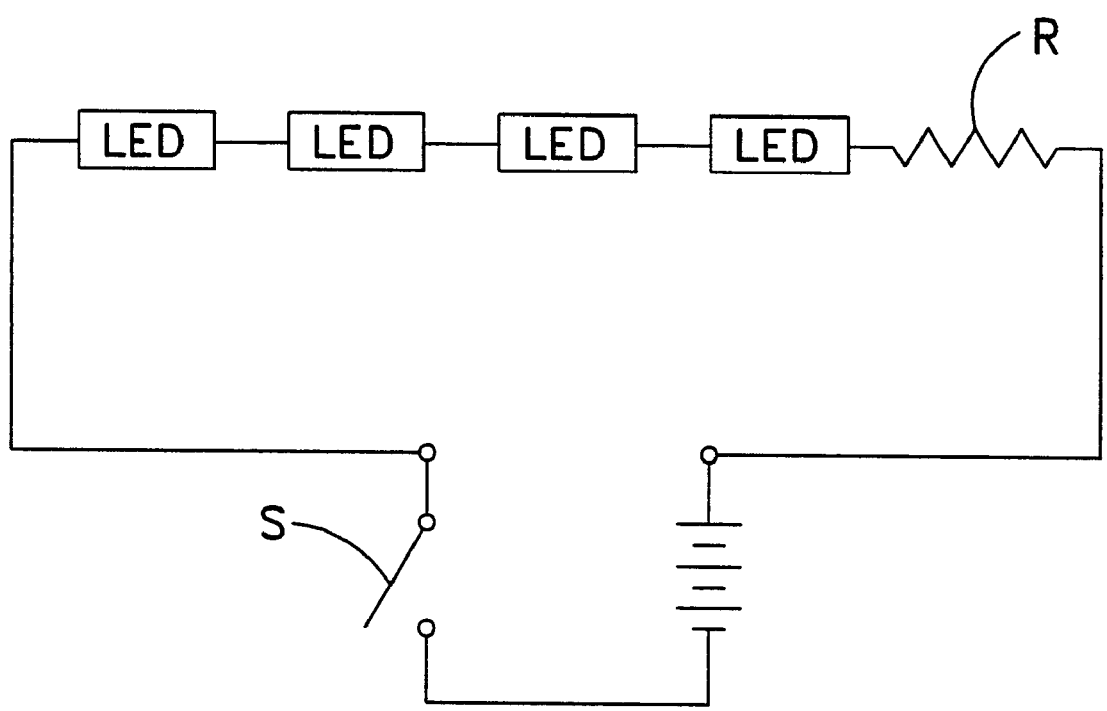
FIG. 10 is a schematic circuit diagram.

Applicant's FIG. 9 embodiment is similar to the FIG. 8 embodiment but locates a second LED 462 at the opposite end of the light transmitting member 11. The FIG. 9 handle 410 is thus free of reflectors at both ends of the light transmitting member 11. Thus, compared to FIGS. 1–7, this embodiment reduces parts, assembly, and inventory costs. On the other hand, this embodiment, by providing LEDs 62 and 462 at respective ends of the light transmitting member 11 increases the brightness of the illuminated light transmitting member 11. The second LED 462 at the second end of the light transmitting member 11 applies more light to the second end portion of the light transmitting member 11 than would a mirror, or reflector, by itself. Also, due to the narrowness of the output beam of a typical LED, virtually all of the light emitted by the second LED 462 is in a narrow beam less wide than, and substantially coaxial with, the opposed second end portion of the light transmitting member 11. Light output from the LED 462 in other directions is small enough that redirection by a reflector into the second end portion of the light transmitting member 11 would likely not be noticed.

While the opposed reflectors 45 and 73 in the FIG. 6 embodiment reflect some of the light from the respective remote LEDs 62 and 462, light losses along the member 11 and at each reflector 45 and 73 would tend to mask any loss of member 11 brightness caused by eliminating such reflectors.

FURTHER MODIFICATION

Figure 12:
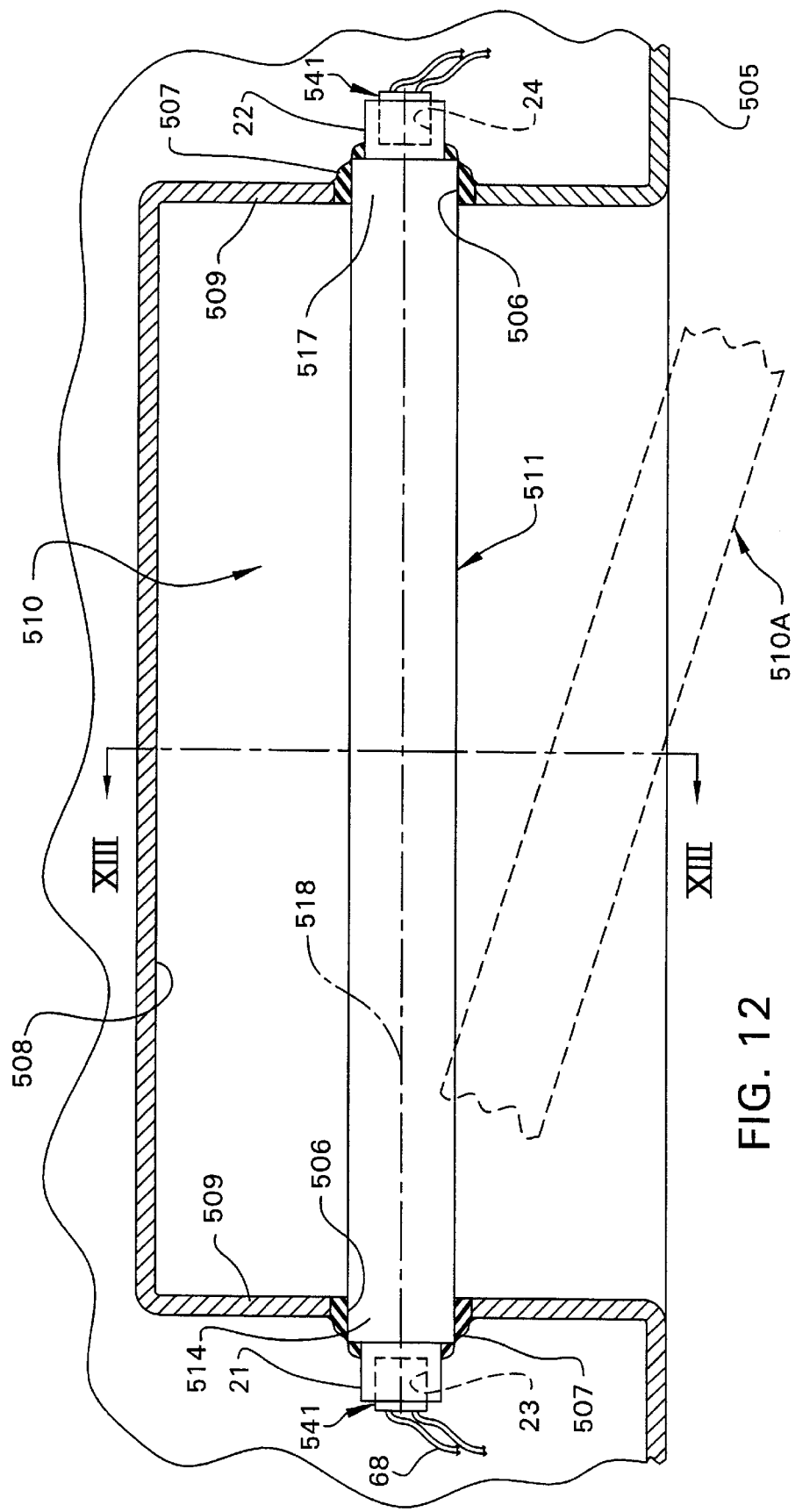
FIG. 12 is a front view of a lighted handle according to yet another embodiment of this invention.
Figure 13:
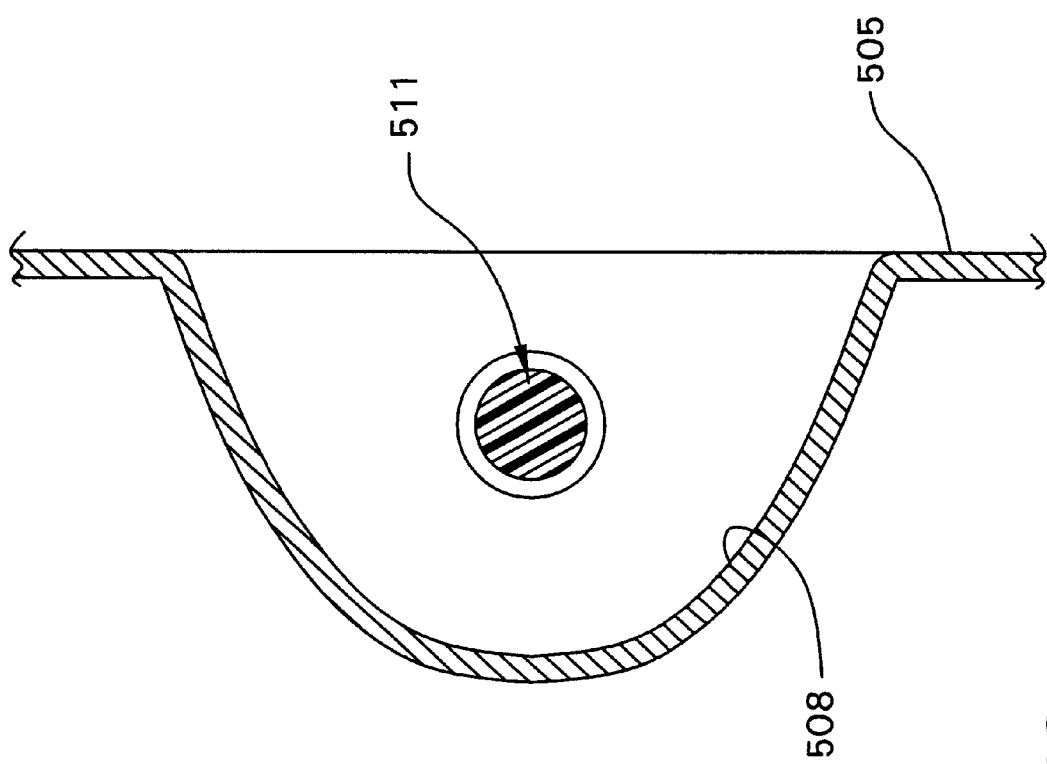
FIG. 13 is a cross-sectional view taken substantially on the line XIII—XIII of FIG. 12.

A further modified lighted handle 510 is illustrated in FIGS. 12 and 13. Components of the handle 510 that are similar or identical to previously described components of the handles 10-410 carry the same reference numerals with the prefix "5" added thereto.

The lighted handle 510 includes a solid light transmitting member 511 (FIG. 12) that has first and second end portions 514 and 517. The light transmitting member 511 is preferably straight. In other words, its first and second end portions 514 and 517 are coaxial with the longitudinal axis 518 of the central portion 516 of the light transmitting member 511.

The end portions 514 and 517 (FIG. 12) terminate in reduced diameter, preferably cylindrical necks preferably similar to the necks 21 and 22 of FIGS. 1A and 1C, respectively, with their respective end opening recesses 23 and 24. It will be understood that such end opening recesses 23 and 24 in the FIG. 12 embodiment, are preferably coaxial with the longitudinal axis 518 of the light transmitting member 511.

Mounted in each recess 23 and 24 is a light directing insert 541 (FIG. 12) preferably similar to one of the light directing inserts 41 and 341 of FIGS. 2A and 8, respectively, but preferably omits the end piece 53. Thus, each insert 541 preferably includes either a reflective casing 43 (FIG. 2A) or a non-reflective casing 76 (FIG. 8).

The inserts 541 (FIG. 12) are fixed in the respective recesses 23 and 24 by any convenient means, e.g. removably as in FIG. 1A or substantially permanently, as by an adhesive means. In either case, the inserts 541 are fixed in alignment with the light transmitting member 511. If desired, a suitable end cap, or other device, not shown, could be removably fixed to each end of the light transmitting member 511 to removably fix the inserts 541 thereto and thus allow ready repair.

The FIG. 12 lighted handle 510 omits the mounting brackets of the lighted handles 10-410 of the FIGS. 1–11 embodiments. Instead, the lighted handle 510 is here recessed loosely in an elongate cavity 508 (FIGS. 12 and 13). The respective end portions 514 and 517 of the lighted handle 510 are received loosely in holes 506 in end walls 509 of the cavity 508, to allow installation by angling the handle 510 into one (the left one in FIG. 12) of the holes 506 beyond its solid line position in FIG. 12 (as shown in dotted lines at 510A), pivoting the handle 510 to its solid line axis in FIG. 12, and then pulling the handle 510 rightwardly into the rightward hole 506, to the extend shown in FIG. 12.

A suitable fixing and bonding substance 507, such as an acrylic caulk is then applied between the cavity end walls 509 and the end portions 514 and 517 to close the holes 506 and to fix the handle 510 to the cavity end walls 509 with the wires 68 hidden behind the surface 505, for connection to a suitable power supply. Once the handle 510 is fixed to the cavity end walls 509, there is preferably sufficient space between the walls 509 and the handle 510 to allow for hand gripping of the handle.

The FIGS. 12 and 13 embodiment is of use as a lighted handle on a door, such as a cargo or engine compartment door on a recreational vehicle. In this use, once the handle 510 is fixed on the door, the inserts 541, and thus the LEDs therein, can be accessed from the backside of the door. Therefore, in the unlikely event that the LED needs replacing, the back portion of the insert 541 can be removed to expose the LED therein. Once the LED is replaced, the insert 541 can be reassembled. Thus, the LED can be replaced without the need to remove the lighted handle 510 from the door.

Applicant has found it advantageous in the disclosed invention to minimize the number of major parts, particularly custom manufactured parts, to thus minimize initial cost to the buyer.

Moreover, Applicant has found it advantageous to minimize maintenance by using light sources having a long service life (LEDs have many times the expected service life of the average incandescent bulb, for example).

Moreover, Applicant has found it particularly advantageous to minimize the electric power consumed by a lighted handle when same is driven by an electrical source of limited capacity, such as the vehicle battery on trucks, recreational vehicles and boats, in situations where it is not practical to connect to the nationwide electrical power grid. Whereas a typical incandescent bulb would waste a significant part of its electrical energy input in producing heat and the need to direct most of its 360° light output by means of imperfect real world reflectors (e.g. due to light absorption at the surface of the reflector and reflector light scattering), Applicant finds that a typical LED is free of such energy waste (e.g. an LED does not produce noticeable heat, if any, and provides a narrow light output beam without need for a reflector).

Thus, as used in the present invention, an LED can supply more than sufficient lighting of the light transmitting member 11, with surprisingly little electric power.

For example, a typical high output (5,000 millicandle (mcd)) LED in use draws 0.020 milliamperes (mA). Indeed, a circuit (e.g. in FIG. 10) connecting several (e.g. 2) such LEDs in series, along with the proper series load resistor R, draws the same 0.020 mA. With that circuit connected through a switch S across a nominal 12 volt vehicle battery B of the kind mentioned above, the in-use power draw is thus only about ¼ of a watt, a load sustainable for many hours, without need for recharge, excessive discharge or damage, by a typical 80 ampere hour vehicle storage battery. Indeed, with the particular LED type mentioned above operated at the current level mentioned above, a single ¼ of a watt circuit could include two of Applicant's FIG. 6 dual LED grab handles or four of Applicant's FIGS. 1–5 single LED handles. Even if operated at above nominal rated current levels (e.g. at 40 mA) for a substantial increase in light output, such a multi-LED circuit would still draw only about ½ of a watt to illuminate one dual LED handle or two single LED handles, and without an inconvenient reduction of operating life span.

The wattage requirement for handles of comparable light transmitting bar light output using incandescent light sources would be substantially higher and the operating life substantially lower.

It should be appreciated that the foregoing description is for the purposes of illustration only, and further alternative embodiments of this invention are possible without departing from the scope of the claims. For instance, the white LED light emitters included in the light assemblies illustrated herein could be replaced by a red LED light emitter. This alternative might be preferable for use at night to help preserve night vision of an RV driver or boat helmsman. Additionally, the outer surface of the light transmitting member 11 could be etched or marked to include a family or product name or a logo. Further, while only a single O-ring has been illustrated forming a seal between the end, or ends, of the light transmitting member 11 with the respective end bracket(s), two or more O-rings could instead be used. Alternatively, a different non-permanent sealing means could instead be substituted.

Thus, although particular preferred embodiments of the present invention have been disclosed in detail for illustrative purposes, it will be recognized that variations or modifications lie within the scope of the present invention and do not depart from the spirit of the invention.

What is claimed is:

1. A lighted handle comprising:
   a light transmitting member having a first end portion, a second end portion and a central portion;
   a first end bracket attached to said first end portion and a second end bracket attached to said second end portion;
   a first locator unit located between said first end bracket and said first end portion of said light transmitting member, wherein said first locator unit is free of reflective surfaces;
   a second locator unit located between said second end bracket and said second end portion of said light transmitting member, wherein said second locator unit is free of reflective surfaces;
   at least one of said first and second locator units including an end piece that seats on a step of the respective first and second end brackets; and
   an illumination unit located at least partially in said first end bracket and including a light emitter positioned between said first locator unit and said second locator unit, wherein said light emitter is oriented to emit light toward said second locator unit.

2. The lighted handle of claim 1, wherein said light transmitting member is a substantially transparent bar having an end-to-end light transmitting capability.

3. The lighted handle of claim 1, wherein said first locator unit and said second locator unit are coaxial with said light transmitting member.

4. The lighted handle of claim 1, wherein said central portion of said light transmitting member has a longitudinal axis; and
   said first and second end portions have respective length axes angled from said central portion longitudinal axis.

5. The lighted handle of claim 1, wherein said first end portion includes a reduced diameter portion having a first end recess;
   said first end bracket includes an opening sized to receive said reduced diameter portion, wherein a step is positioned in said opening; and
   said first locator unit includes a casing that is sized to fit snugly within said first end recess and an end piece that is seated on said step when said lighted handle is assembled.

6. The lighted handle of claim 1, including a stripe extending lengthwise within said light transmitting member.

7. The lighted handle of claim 6, wherein said stripe is reflective.

8. The lighted handle of claim 6, wherein said stripe is non-reflective.

9. The lighted handle of claim 6, wherein said stripe is opaque.

10. The lighted handle of claim 1, wherein said light transmitting member is composed of a substantially clear acrylic material and includes a paint stripe co-extruded in said light transmitting member.

11. A lighted handle, comprising:
    an elongate light transmitting member having first and second end portions;
    first and second, support surface engageable, mounting brackets carrying said first and second end portions of said light transmitting member; and
    a narrow beam light emitting diode located in said first mounting bracket and aimed longitudinally of said light transmitting member to make same more visible.

12. The lighted handle of claim 11, including a locator unit positioned in said first mounting bracket, wherein said locator unit includes a casing having a bore through which said light emitting diode extends; and
    said locator unit includes a reflective surface adjacent said light emitting diode.

13. The lighted handle of claim 12, including a second locator unit positioned in said second mounting bracket, wherein said second mounting bracket includes a reflective surface adjacent said second end portion of said light transmitting member.

14. The lighted handle of claim 13, wherein said second locator unit includes a second casing having a second bore; and
    including a second light emitting diode that extends through said second bore.

15. The lighted handle of claim 11, including a locator unit positioned in said first mounting bracket;
    said locator unit includes a casing having a bore through which said light emitting diode extends; and
    said locator unit includes a non-reflective top surface adjacent said light emitting diode.

16. The lighted handle of claim 11 including a second narrow beam light emitting diode fixed in said second bracket and aimed longitudinally thereof, such that light is transmitted from opposite ends of said light transmitting member along the length thereof.

17. The lighted handle of claim 16, wherein a second locator unit is positioned in said second mounting bracket, wherein said second locator unit includes a casing having a bore through which said second light emitting diode extends; and
    said second locator unit includes a non-reflective top surface adjacent said second light emitter.

18. The lighted handle of claim 16 including a series circuit comprising a load resistor and at least said first and second light emitters in series across a pair of input terminals.

19. The lighted handle of claim 18 including a second, similar handle having third and fourth light emitters and wherein said series circuit comprises a load resistor and said first, second, third and fourth light emitters in series.

20. The lighted handle of claim 11, including a load resistor connected in series with the light emitting diode to an AC/DC converter.

21. A lighted handle comprising:
    a solid elongate light transmitting member having first and second ends including first and second end recesses, respectively;
    a first insert mounted in said first end recess and a second insert mounted in said second end recess, wherein said first and second inserts are coaxial with a common length axis of said light transmitting member; and
    an illumination unit positioned in said first end recess and including a narrow beam light emitting diode aligned along said common length axis of said light transmitting member and oriented to emit light toward said second insert.

22. The lighted handle of claim 21, wherein said first insert and said second insert are free of reflective surfaces.

23. The lighted handle of claim 21, wherein said first insert includes a casing having a bore through which said light emitting diode extends; and
    said first insert includes a reflective surface adjacent said light emitting diode and said second insert includes a reflective surface facing said light emitting diode.

24. The lighted handle of claim 21, including a second illumination unit positioned in said second end recess and including a second light emitting diode aligned along a common length axis of said light transmitting member and oriented to emit light toward said first insert.

25. The lighted handle of claim 24, wherein said second insert includes a casing having a bore through which said second light emitting diode extends; and said second insert includes a reflective surface adjacent said second light emitting diode.

26. The lighted handle of claim 21, wherein said first and second inserts are secured in said respective first and second end recesses by an adhesive.

27. The lighted handle of claim 21 including a mount having spaced end walls joined by a side wall, holes in said end walls, said light transmitting member extending along said side wall, said handle extending fixedly through said holes, said inserts extending beyond said end walls, said light emitting diode having electric supply wires located beyond the adjacent said end wall.

28. A lighted handle comprising:

a light transmitting member having a first end portion and a second end portion;

a stripe embedded within the material of said light transmitting member;

a first end bracket at said light transmitting member first end portion, and having a recess; and an illuminating unit included in said first end bracket and having a light emitter, said light emitter being aligned along a common length axis of said light transmitting member.

29. The lighted handle of claim 28, wherein said light emitter is a light emitting diode coaxial with said light transmitting member.

30. The lighted handle of claim 28, including a second end bracket at and supporting said light transmitting member second end portion, wherein an adhesive attaches said second end portion to said second end bracket.

31. The lighted handle of claim 28, wherein said light transmitting member is an extrusion and said stripe is a co-extruded element located in a central portion of said light transmitting member inboard of the peripheral surface of said light transmitting member.

32. The lighted handle of claim 28 in which said embedded stripe extends substantially longitudinally within said light transmitting member.

33. The lighted handle of claim 28 in which said light transmitting member is of a first material and said embedded stripe is of a different material.

34. The lighted handle of claim 33 in said light transmitting member comprises a bar of solid cross-section extending from a central axis radially outward to a surrounding peripheral surface thereof, and which said embedded stripe is inwardly radially spaced from said peripheral surface of said bar.

35. The lighted handle of claim 28 in which plural ones of said embedded stripes are circumferentially spaced and are entirely separated from each other by the material of said bar.

36. The lighted handle of claim 28 in which said light emitting device is a single light emitting diode coaxial with said light transmitting member and whose light output is concentrated in a narrow beam of light emitted directly and lenslessly and coaxially into the opposed end of the light transmitting member, said illumination unit includes a casing having a reflector-free, generally cup-shaped recess bounded by a generally cylindrical peripheral wall and a bottom wall, said recess opening toward said light transmitting member, said light emitting diode extending from said bottom wall toward said light transmitting member and being radially spaced inboard of said peripheral wall.

37. The lighted handle of claim 28, including an annular seal sealingly interposed between said first end bracket and said first end portion of said light transmitting member.

* * * * *